(12) United States Patent
Jebari

(10) Patent No.: US 7,530,431 B2
(45) Date of Patent: May 12, 2009

(54) MACHINE FUNCTIONING ON THE PRINCIPLE OF EXPLOITATION OF CENTRIFUGAL FORCES

(76) Inventor: Jamel Jebari, 10696, d'Iberville, apt. 5, Montréal, Quebec (CA) H2B 2V1

( * ) Notice: Subject to any disclaimer, the term of this patent is extended or adjusted under 35 U.S.C. 154(b) by 285 days.

(21) Appl. No.: 11/730,783

(22) Filed: Apr. 4, 2007

(65) Prior Publication Data

US 2008/0245615 A1 Oct. 9, 2008

(51) Int. Cl.
*F03G 3/00* (2006.01)
(52) U.S. Cl. ....................................... 185/27
(58) Field of Classification Search ............... 185/27, 185/30, 31, 32
See application file for complete search history.

(56) References Cited

U.S. PATENT DOCUMENTS

| 33,139 | A | 8/1861 | Giraudat |
| 2,340,155 | A | 1/1944 | Tanner |
| 4,155,224 | A | 5/1979 | Hopping |
| 4,333,548 | A | 6/1982 | Jones |
| 2008/0011552 | A1* | 1/2008 | La Perle ................. 185/27 |

* cited by examiner

*Primary Examiner*—Kiet T Nguyen
(74) *Attorney, Agent, or Firm*—Equinox Protection; Franz Bonsang, Patent Agent

(57) ABSTRACT

A machine for generating mechanical energy and functioning on the principle of exploitation of centrifugal forces of masses being displaced along a closed mechanical circuit over at least a curved section of the circuit. Optionally, the machines also functions on the principle of energy gain caused by masses falling under the influence of gravity in the closed circuit that is permanently maintained in a state of dynamic unbalance with an input, continuous or not, of external energy.

28 Claims, 12 Drawing Sheets

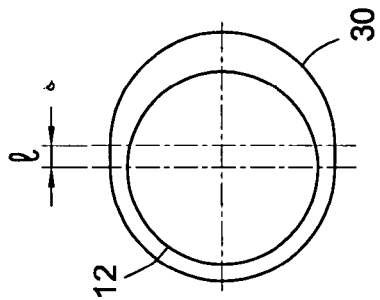
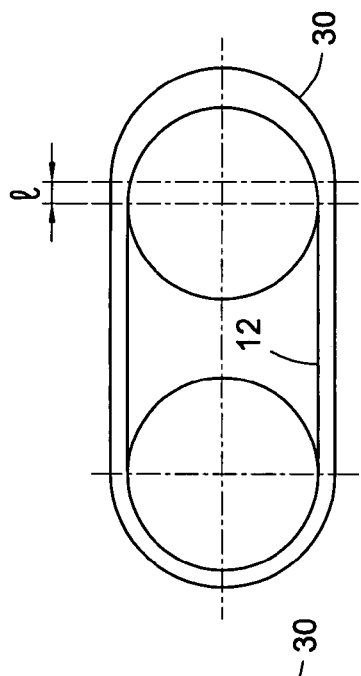
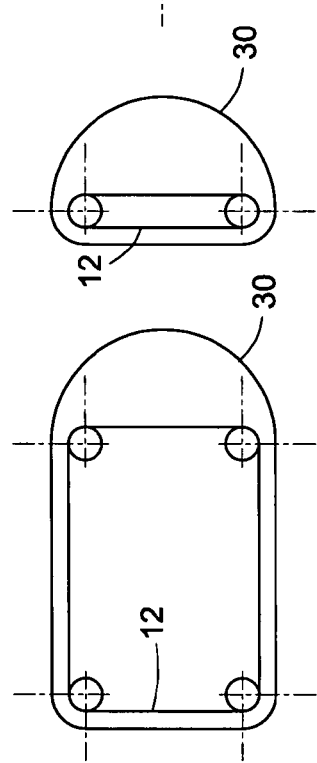
FIG.5a  h>0, L>0
FIG.5b  h>0, L=0
FIG.5c  h=0, L>0
FIG.5d  h=0, L=0

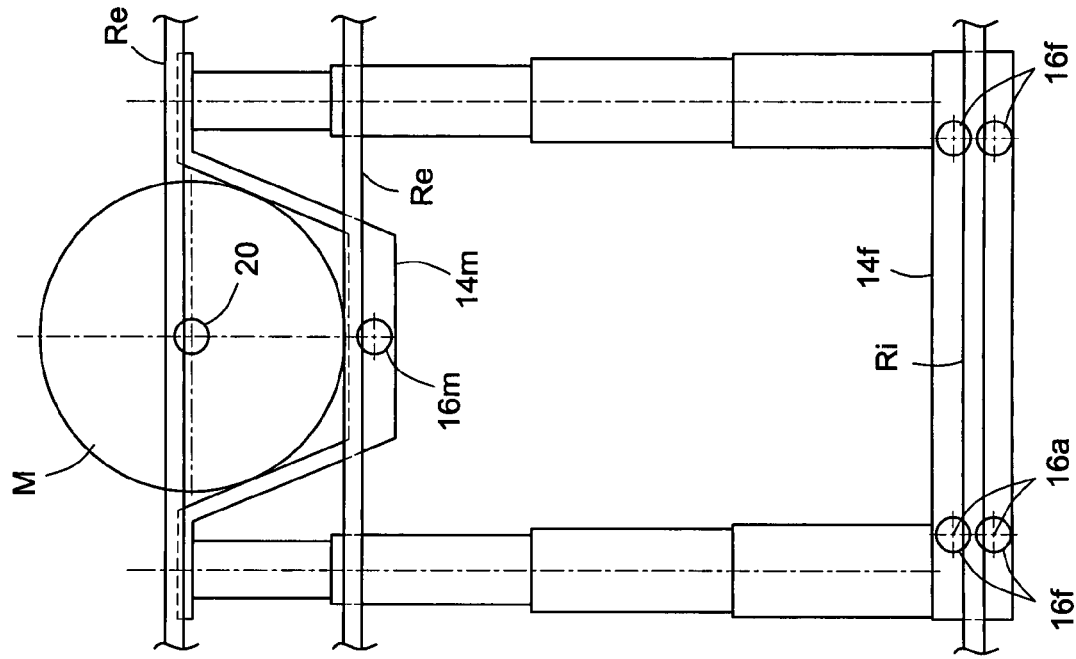
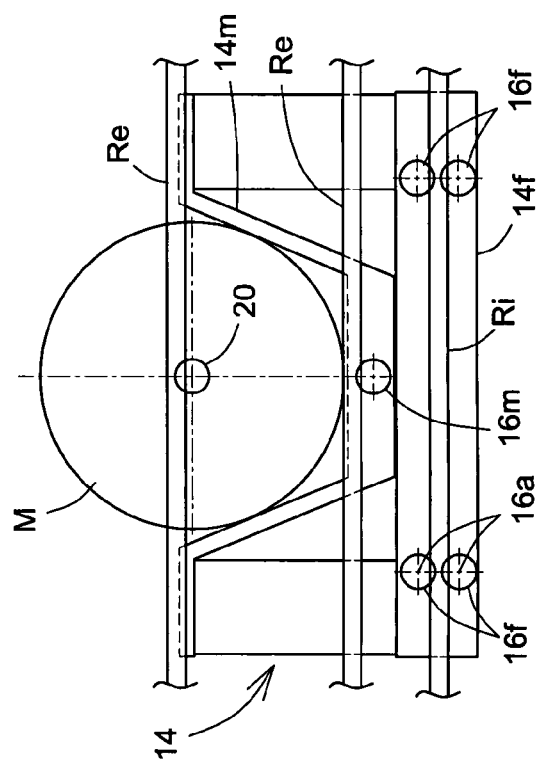
FIG.9b
FIG.9a

MACHINE FUNCTIONING ON THE PRINCIPLE OF EXPLOITATION OF CENTRIFUGAL FORCES

FIELD OF THE INVENTION

The present invention is concerned with a functioning principle for machines generating mechanical energy from centrifugal forces of masses in a closed mechanical circuit, and that is optionally maintained in a permanent state of dynamic unbalance using the falling of masses under the effect of earth's gravitational field.

BACKGROUND OF THE INVENTION

As is well known, a mass (M) that is situated at a given height (h) has a stored potential energy (PE) of PE=M*g*h. When mass (M) is in free fall, potential energy (PE) is transformed into kinetic energy, and the energy conservation law permits the formulation of the following:

$$M*g*h = (1/2)*M*V^2$$

where (V) is the velocity attained by the mass (M) after falling from height (h) and (g) is the acceleration of mass (M) due to the earth's gravitational field, namely 9.81 m/s^2 (or 32.2 ft/s^2).

However, to perpetuate the falling motion of mass (M), it is necessary to raise the mass (M), after it (M) has fallen, once again to the starting point for the falling motion of the mass (M), namely the height (h). This raising requires furnishing of energy to mass (M), namely [M*g*h], without taking resistance into account, and thus there is no gain of energy as i.e. M*g*h=M*g*h when M, g, and h all have the same value.

It is to be noted that the fall of any mass in the earth's gravitational field is considered to be a state of dynamic unbalance (the sum of the external forces acting on the mass (M) during the fall is not null, i.e. not zero), which is different form any today existing machine.

To date, no machine can continuously generate more mechanical energy (positive gain, energetic efficiency ratio larger than one (1)) than the amount of energy input therein from outside, such as from Man.

Accordingly, there is a need for a machine functioning on the principle of exploitation of centrifugal forces, and typically on the principle of potential energy gain for generating mechanical energy.

SUMMARY OF THE INVENTION

It is therefore a general object of the present invention to provide a machine functioning on the principle of exploitation of centrifugal forces, and typically on the principle of potential energy gain for generating mechanical energy.

An advantage of the present invention is that the machine functioning on the principle of exploitation of centrifugal forces can be implemented in different ways, with different sizes for different output gains, while exploiting the centrifugal forces over at least one curved section.

Another advantage of the present invention is that the machine, also functioning on the principle of potential energy gain, to have an energetic efficiency ratio defined by a ratio of the mechanical energy generated by the machine over the sum of all external energy inputs (including from Man) provided into the machine larger than one, is permanently maintained in a state of dynamic unbalance, while having a system for exploiting centrifugal forces.

Another advantage of the present invention is that the machine functioning on the principle of potential energy gain can be realized in a multitude of different ways, and sizes for different output gains.

In accordance with an aspect of the present invention, there is provided a machine for generating mechanical energy, said machine comprising: a closed circuit rotationally driven around at least one rotationally free wheel at least temporarily by an input of external energy, a plurality of masses selectively connecting to the closed circuit to move therealong; a system for guiding the masses along the circuit to allow the masses to travel therealong; and a system for exploiting centrifugal forces of the masses located on at least one curved section of the closed circuit to add to the circuit an energy from the centrifugal forces of the masses and different than said input of external energy.

In one embodiment, the system for exploiting centrifugal forces of the masses allows the masses to move, typically generally freely, in a substantially radial direction when on said at least one curved section.

In one embodiment, the masses selectively connect to the closed circuit between a relatively upper point thereof and a relatively lower point thereof, and provide kinetic energy to the closed circuit due to transformation of potential energy of the masses while falling within the earth's gravitational field from the upper point to the lower point, and wherein the guiding system includes a mass track adapted to allow the masses to travel from the lower point to the upper point while being disconnected from the closed circuit and using at least their own kinetic energy at the lower point, said machine comprising: a system for disconnecting the masses from the closed circuit at a location adjacent the lower point so as to selectively maintain the closed circuit into a state of permanent dynamic unbalance; a system for connecting the masses to the closed circuit at a location adjacent the upper point so as to selectively maintain the closed circuit into the state of permanent dynamic unbalance; and said at least one curved section of the closed circuit being at least partly located between the upper point and the lower point.

Conveniently, the mass track includes a substantially circular arc portion thereof extending between the lower point and the upper point.

Typically, the mass track includes a generally semi-circular portion thereof extending between the lower point and the upper point.

Conveniently, the closed circuit includes a lower portion ending at the lower point, the mass track includes a lower track portion selectively and movably supporting the masses therealong before reaching the lower point.

In one embodiment, the mass track immediately follows the system for exploiting centrifugal forces of the masses and is substantially tangentially oriented relative to a trajectory of the masses exiting the system for exploiting centrifugal forces.

In one embodiment, the guiding system includes a subsystem for selectively retaining the masses along the closed circuit at least between the upper point and the lower point.

Conveniently, the guiding system includes a plurality of mass trucks displaceable around the at least one wheel for selectively receiving the masses therein along the closed circuit between the upper point and the lower point, the retaining subsystem maintaining the masses into respective said trucks between the upper point and the lower point.

Conveniently, each of said trucks includes a fixed part movable along said at least one wheel along the circuit between the upper point and the lower point, and a mobile part radially movable relative to the fixed part between a closed configuration in which the fixed and mobile parts are in proximity to one another and a deployed configuration in which the mobile part is spaced away from the fixed part.

Typically, mobile part of the truck is selectively and freely radially movable from the closed configuration into the deployed configuration when the truck is on said at least one curved section.

Conveniently, the disconnecting system includes a release mechanism to selectively disconnect the masses from the respective of said trucks adjacent the lower point.

Conveniently, the closed circuit includes an upper portion starting at the upper point and ending at an upper portion endpoint, and the connecting system connects the masses to the closed circuit at a location between the upper point and the upper portion endpoint.

Typically, the connecting system includes a mass magazine for receiving the disconnected masses from the lower point adjacent the upper point, the mass magazine temporarily containing at least one said disconnected masses therein and connecting one said at least one said disconnected masses to an empty one of said trucks between the upper point and the upper portion endpoint for each one of the disconnected masses reaching the upper point.

Conveniently, the system for connecting masses recuperates at least part of the kinetic energy of the masses disconnected from the lower point once arrived into said magazine.

Alternatively, the system for connecting masses allows each said mass to have at least the velocity of said circuit at the time of connection therewith using an input of work external to the circuit.

Alternatively, the connecting system includes a mass delivery mechanism receiving the disconnected masses from the lower point adjacent the upper point and connecting a received one of said disconnected masses to an empty one of said trucks between the upper point and the upper portion endpoint for each one of the disconnected masses reaching the upper point.

Conveniently, the release mechanism selectively operates when velocity of the masses at the lower point is equal to or larger than a predetermined value, thereby ensuring the masses have sufficient kinetic energy to reach the upper point.

In one embodiment, the masses are equally spaced apart from one another along the closed circuit between the upper point and the lower point.

Conveniently, the kinetic energy provided to the closed circuit is greater that a resistant work including work consumed by friction forces of the plurality of masses in the relative respective displacement therealong and by the mass connecting system for connection of the respective said masses adjacent the upper point.

Conveniently, the system for connecting masses accelerates the masses when arrived at the upper point up to a velocity generally equal to the velocity of said circuit using an input of external energy.

Typically, the systems for disconnecting masses, for connecting masses and for exploiting centrifugal forces of masses are only activated once the circuit has reached a predetermined velocity.

In accordance with another aspect of the present invention, there is provided a machine for generating mechanical energy, the machine comprising: a closed circuit located around one or a plurality of rotationally free wheels with a plurality of masses being displaced therealong, said closed circuit being movably driven to reached a predetermined velocity equal to or larger than a minimum velocity using an at least temporarily maintained input of external initial energy; a system allowing the masses to be guided along their displacement along the closed circuit; and a system allowing exploitation of centrifugal forces of the masses located on at least one curved section of the closed circuit to add to the circuit an energy from the centrifugal forces of the masses and different than said input of external initial energy.

In one embodiment, the masses provide the closed circuit with kinetic energy due to the transformation of potential energy of the masses while falling within the earth's gravitational field, said machine including: a system allowing the masses to disconnect from the closed circuit at a lower point thereof in order to maintain the closed circuit into a state of permanent dynamic unbalance; a system allowing the masses to connect to the closed circuit at an upper point thereof; and a system allowing the masses, once disconnected from the closed circuit at the lower point, to join the closed circuit at the upper point using kinetic energy from the mass' own velocity at a time of disconnect from said closed circuit.

Conveniently, the system allowing the masses to connect to the closed circuit allows the masses to reach the velocity of the circuit at the time of connection thereto with an input of external energy.

Typically, the system allowing the masses to connect to the closed circuit includes a system allowing recuperation by the circuit of kinetic energy of the masses once arrived at the upper point.

In one embodiment, the shape of the circuit generates tangential reactions due to centrifugal forces so as to add positive work to its components in motion.

Alternatively, the shape of the circuit allows the masses to have a quantity of energy due to centrifugal forces when disconnecting form said circuit at the lower point, in addition to the kinetic energy generated by the velocity of said circuit.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein:

FIGS. 5a to 5d are schematic elevation views of other embodiments of the basic circuit configuration;

FIGS. 9a and 9b are enlarged schematic elevation views showing an example of the different parts of a truck in a closed configuration and a deployed configuration, respectively;

DETAILED DESCRIPTION OF THE PREFERRED EMBODIMENTS

Figure 1:
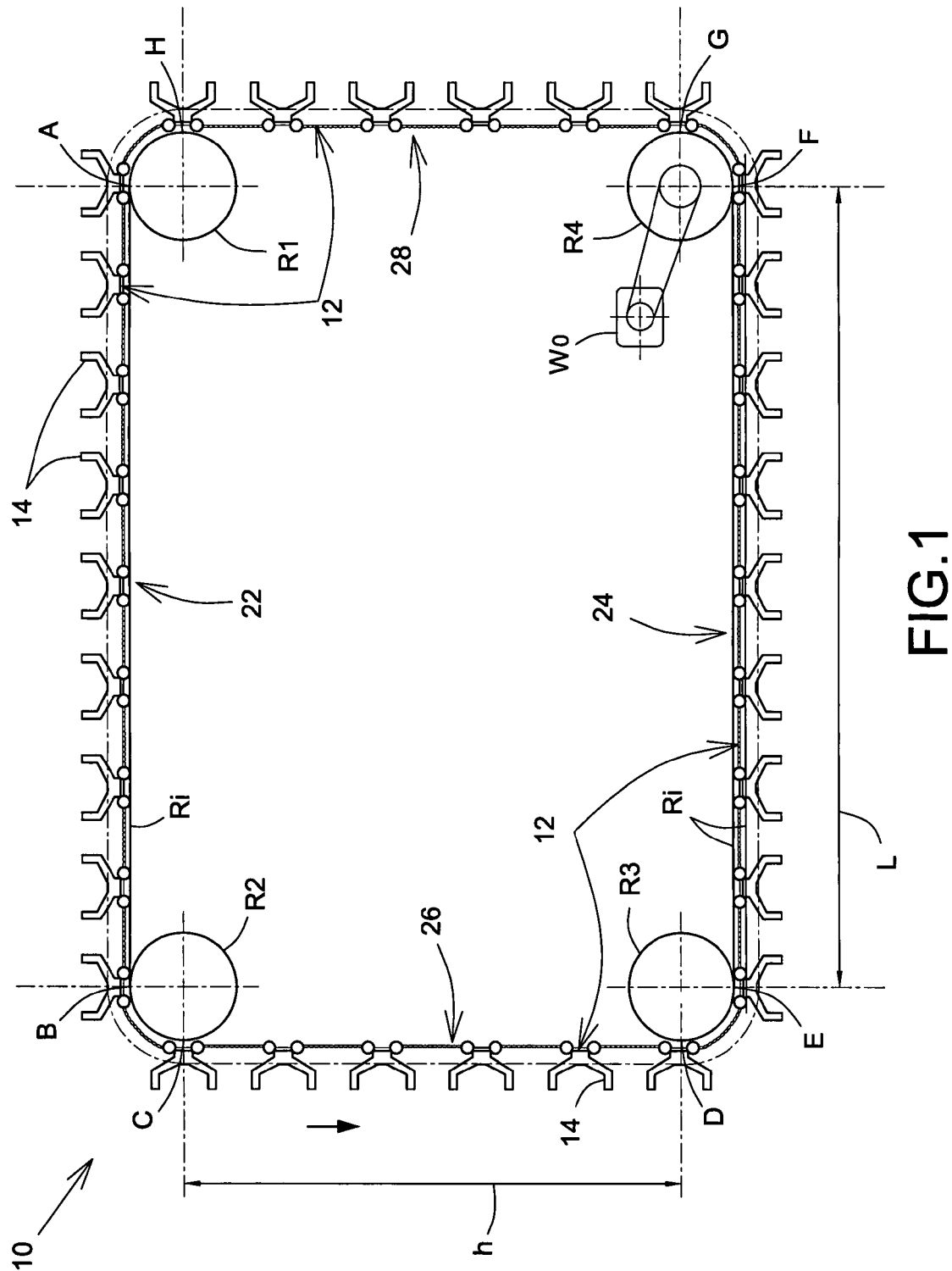
FIG. 1 is a schematic elevation view of a machine functioning on the principle of potential energy gain, without any system for exploiting centrifugal forces, in accordance with an embodiment of the present invention showing a basic closed circuit defined by four wheels and having empty trucks.

In the following sections, in order to explain the functioning principle, object of the present invention, the following example of a corresponding machine will be looked at.

It is noted that the following description shows that the machine of the present invention can have a vertically oriented component to take advantage of the potential energy of masses, although the machine can also operate in a generally horizontal plane where only the friction forces will be considered.

The functioning principle consists in maintaining a closed mechanical circuit under motion generated by falling masses (M) due to the earth's gravitational field in a permanent state of dynamic unbalance with the exploitation of centrifugal forces and a selective input of external energy, without contradicting the energy conservation law.

The present invention is gradually described in the following paragraphs in order to ease comprehension thereof.

A—Basic Systems (Without Exploitation of Centrifugal Forces)

With reference to FIGS. 1 to 4 there is shown a machine 10 functioning on the principle of energy gain caused by masses M falling under the influence of gravity in a closed mechanical circuit 12 that is permanently maintained in a state of dynamic unbalance.

The closed mechanical circuit 12 is driven by an initial external energy W0 and potential energy of masses M around at least one, four shown in FIGS. 1 to 4, rotationally free wheels R1, R2, R3 and R4 disposed in corners of a substantially rectangular format. Any one of the wheels R1, R2, R3, R4 could be used to recuperate the gained mechanical energy and to transfer the same to other machines (not shown) in order to transform this mechanical energy into electrical energy for example. Typically, the circuit 12 includes a mass guiding system that includes a truck guiding subsystem including an inner rail Ri or track on which a plurality of trucks 14 is mobile in an anti-clockwise direction as viewed in the figures.

Preferably, each truck, having a mass (m), rolls on internal rails Ri, typically with bearings 16, although any other friction reducing mechanism could be considered. The trucks 14 are preferably equidistant and connected to one another by a flexible mechanical link 18, such as chains, as shown in FIG. 1.

The circuit 12 shown in FIG. 1 is in dynamic balance, and a mass M is added to each truck 14. Conveniently, the masses M slide, on their bearings 20 or the like friction reducing mechanism, along external rails Re or tracks that form part of another subsystem of the mass guiding system for selectively retaining the masses M along the closed circuit 12, at least between the upper point A and the lower point F.

Figure 2:
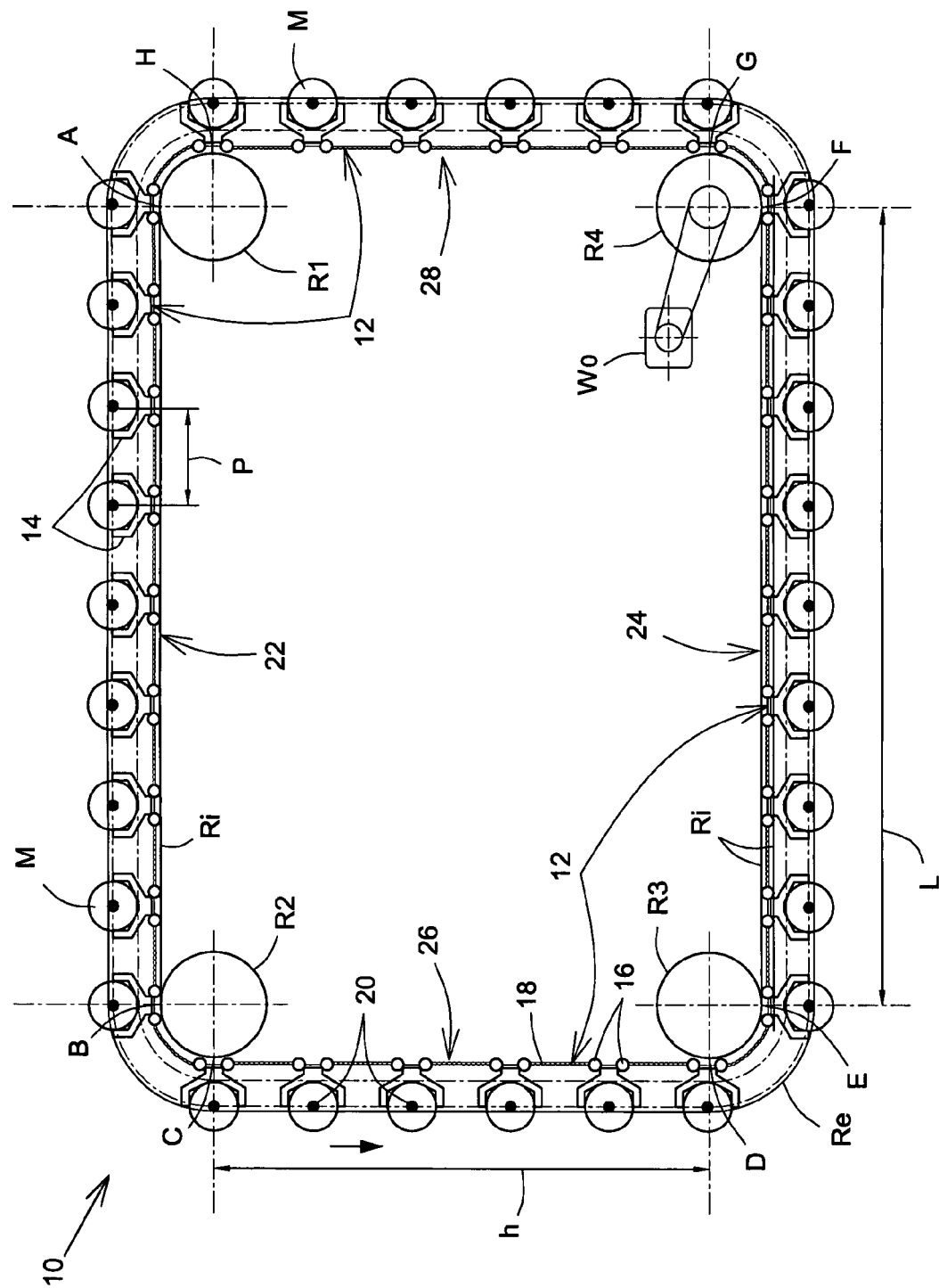
FIG. 2 is a schematic elevation view showing the circuit of FIG. 1 with masses shown in situ within the trucks.

With the masses M, the circuit 12 remains in dynamic balance (the sum of the external forces being zero), as shown in FIG. 2.

The circuit 12 typically defines a substantially horizontal upper portion 22 extending between a relatively upper point A of the circuit and an upper portion endpoint B, and a similar substantially horizontal lower portion 24 extending between a lower portion start point E and a relatively lower point F of the circuit. The circuit 12 also defines a lowering portion 26 between points B and E and a raising portion 28 between points F and A. Although all the portions 22, 24, 26, 28 are shown as being substantially straight, one skilled in the art would understand that any other shape could be considered without deviating from the scope of the present invention.

A dynamic unbalance is introduced into the circuit 12 according to the following conditions:

1—The circuit 12 is turned (operated) around wheels R1, R2, R3, R4 at an initial velocity V0, using an externally provided input energy W0.

2—Mass M is disconnected, detached or released from its corresponding truck 14 (and therefore the circuit 12) adjacent lower point F via a release mechanism (such as the shape of the mass receptacles of the trucks 14 or any other mechanism) of a mass disconnecting system.

3—An additional mass M is connected or attached to the circuit 12 (or an empty truck 14) at upper point A via a mass connecting system each time an empty truck 14 is located adjacent the upper point A. Typically, the mass M is accelerated at the mass connecting system level up to a speed equals to the velocity, or speed, of the circuit Vcir using external energy Wmag (the influence of the additional mass M as well as the provenance of the additional mass M is explained below).

The guiding system, connecting system and disconnecting system are typically mechanical systems although they could easily be at least partially electrical, electronic, etc.

The periodic distance P which separates two adjacent trucks 14 refers to the period (i), namely the distance traveled by a truck 14 for it to arrive at the position of the truck immediately preceding it. The balance of energy for each period (i) is then as follows:

1—Potential work:

$$Wpot = M*g*(h+2*RM)$$

where RM is the radius of displacement of the center of mass of the mass M, h is the vertical distance traveled by the masses (and trucks) in which friction does not occur between wheels (R2, R3, and R4, R1; i.e. between points C and D (circuit lowering portion 26) and between points G and H (circuit raising portion 28)) and g is the acceleration constant of the earth's gravitational field.

2—Resistant Work (friction between points; from point H to point C and from point D to point G, assuming that the trucks 14 are free from the inner rails Ri from point C to point D and from point G to point H; which could not be the case and then added into the following equation):

$$Wres = P*g*Cf*\Sigma(M+m)_{12}$$

where $\Sigma(M+m)_{12}$ is the sum of all the masses being along the circuit 12, and Cf is the coefficient of friction of the bearings (different coefficients of friction could be considered for different locations, but assumed to be all the same in this example).

This simplified formula (not taking into account integral calculus due to the centrifugal forces, which should be considered for accurate prediction) is provided as an example to show the different parameters (M, m, Cf, P, etc.) that could intervene within the calculation of the resistant work. In fact, the calculation formula for the resistant work varies from a circuit configuration to another, for example if the closed circuit is supported by inner rails Ri between all points A, B, C, D, E, F, G, H, or only along the portion from point H to point C for example, or if the weight of masses (M+m) is supported by external rails Re between points C, D, E, F, or according to the shape of the closed circuit which depends on the actual values of h and L (see FIG. 5). The goal of the above-noted resistant work Wres formula is to show that the parameters used therein (M, m, Cf, P, etc.) can be selected to minimize the resistant work.

We state:

$$W(+)=Wpot-Wres$$

This work W(+) may be positive depending on the choice of sizes of M, m, Cf, h, L, r, and RM.

L is the horizontal distance traveled by the masses (and trucks) between wheels (R1, R2, and R3, R4; i.e. between points A and B (circuit upper portion 22) and between points E and F (circuit lower portion 24)), and r is the radius of wheels (R1, R2, R3, R4).

3—At the beginning of each period (i), the circuit 12 looses a quantity of energy equals to $[(½)*M*Vcir(i-1)^2]$ due to the disconnecting of the mass M around lower point F, and with the connecting of mass M to the circuit 12 around upper point A, the circuit provides to the mass, during period (i), a quantity of energy equals to $[(½)*M*Vcir(i)^2]$. Mass M gets to the upper point A with its own kinetic energy (WMA(i): energy of mass M at point A for period (i)) to connect to an empty truck 14. The mass' energy WMA(i) will subtracted from the energy to be provided by the circuit 12.

Figure 3:
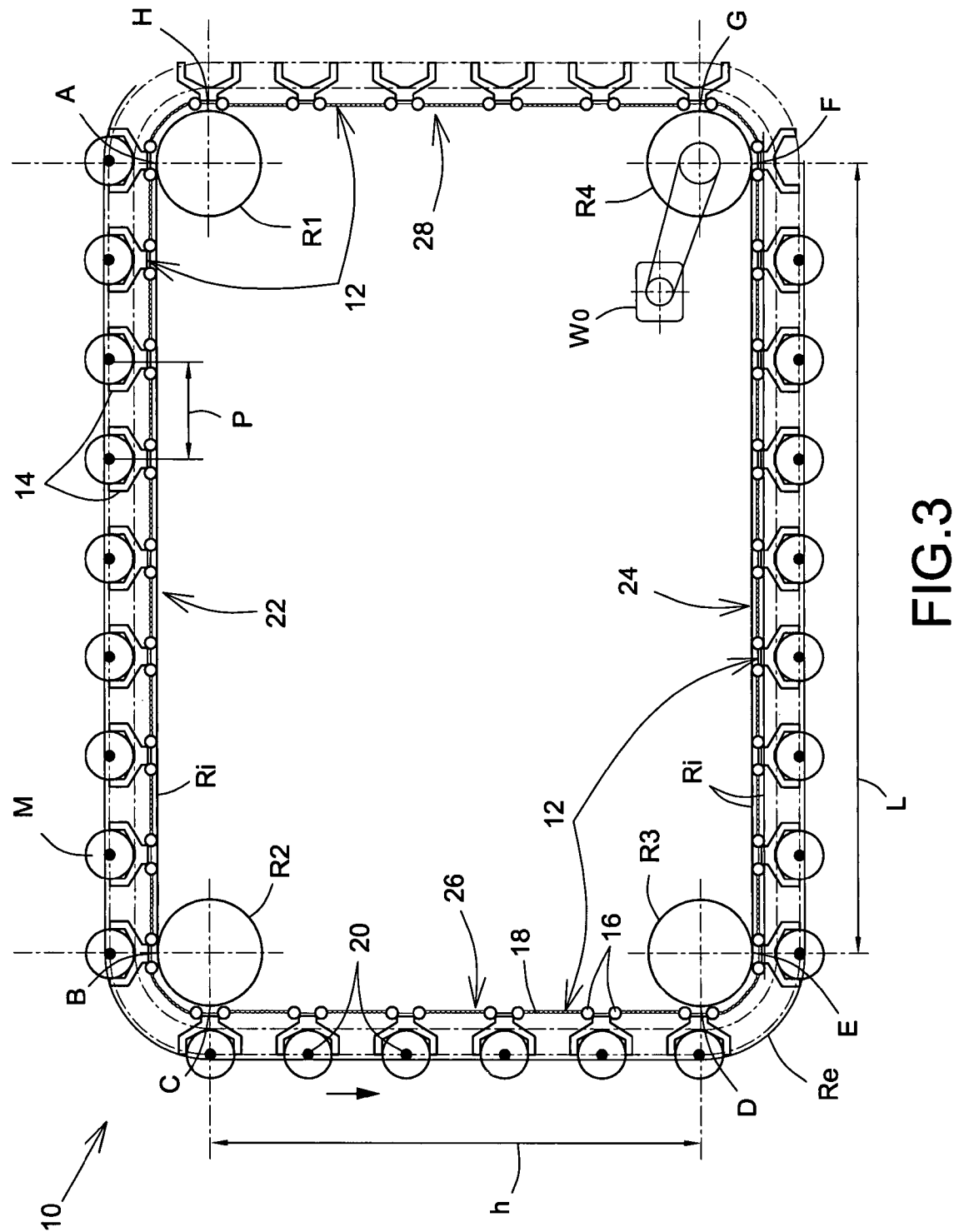
FIG. 3 is a schematic elevation view of FIG. 2 with some masses removed from the trucks moving upward (from point G to point A)
Figure 4:
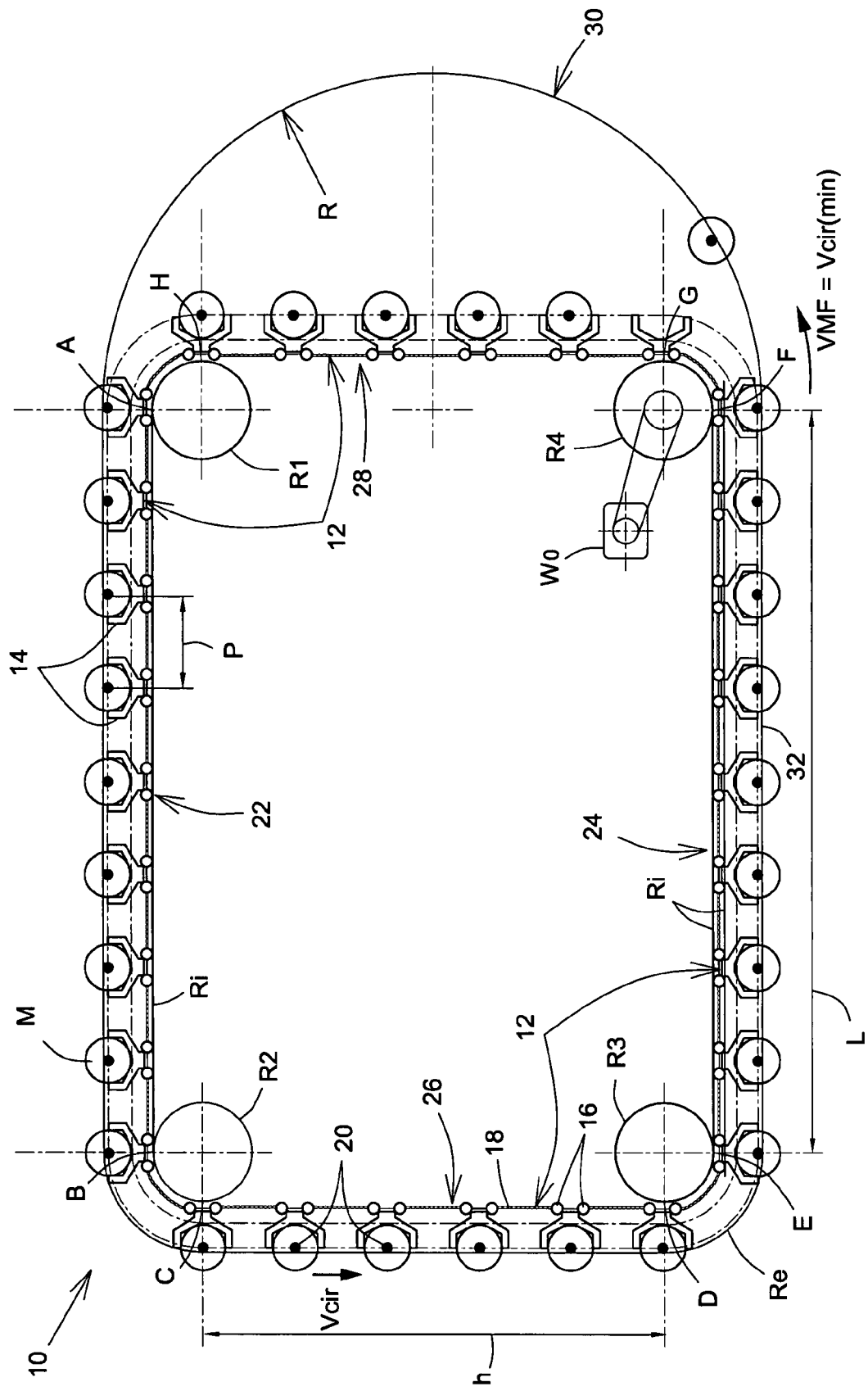
FIG. 4 is a schematic elevation view of FIG. 3 with an off-circuit by-pass track for the masses moving upward disconnected and away from the trucks.

Mass M disconnects from truck 14 at lower point F, shown in FIG. 3, while maintaining the same velocity Vcir as that of the circuit 12. By having a mass track 30, for off-circuit 12 upward displacement, of the mass guiding system forcing mass M to typically follow a substantially circular arc, preferably semi-circular curve, of radius R which returns mass M to upper point A, as shown in FIG. 4.

Mass M can gain height up to the upper point A of the circuit 12 in function of the velocity of mass M at the departure from lower point F, i.e. in function of the velocity of the circuit Vcir when mass M is disconnected from the truck 14, by taking the mass track 30. It is therefore needed, at the time of disconnect of mass M, that the velocity of the circuit Vcir exceeds the required predetermined value that enables mass M to reach the upper point A with a velocity VMA larger than [SQUARE ROOT(g*R)].

In fact, for mass M to reach the upper point A, the velocity of mass M at lower point F must permit the mass M to have, at upper point A, a centrifugal force at least equal to the gravitational weight (earth gravitational force) of mass M:

$$M*g=M*VMA^2/R$$

This means that mass M must arrive at upper point A with a kinetic energy at least equal to $[(½)*M*g*R]$ by adding sufficient energy to raise mass M by a height equals to (2*R), namely [2*M*g*R] as an increase in its potential energy, and to include WfM, the amount of energy required to counter the friction along the curve R of the mass track 30 (friction due to the mass' weight and to centrifugal forces); thus obtaining a departure kinetic energy for mass M of $$WMF=[(½)*M*g*5*R]+WfM=(½)*M*Vcir^2$$

Accordingly, the velocity of departure of mass M from lower point F, i.e. the velocity VMF of mass M when mass M disconnects from the circuit 12 at lower point F, must be at least equal to:

$$Vcir=VMF=\text{SQUARE ROOT}[(5*g*R)+(2*WfM/M)]=Vcir(\min)$$

From which, in a general way:

$$WMA(i)=[(½)*M*Vcir(i-Nh-2)^2]-[M*g*2*R]-WfM$$

where Nh is the number of periodic distances P between points C and D, and also between points G and H, and Vcir (i−Nh−2) is the speed of mass M at the time of disconnection from the circuit at lower point F (VMF).

During the return of mass M towards upper point A, mass M has no influence on the behavior of the circuit 12. In fact, once the mass M is disconnected from the circuit 12 at lower point F, the mass M and the circuit become totally independent of each other.

4—Input of external energy into the circuit:

W0

5—(Another embodiment) With input of external energy Wmag(i), at the level of magazine 40 (see details hereinbelow), to the mass M at the time of connection to the circuit at the upper point A during period (i):

$$Wmag(i)=[(½)*M*Vcir(i)^2]-WMA(i)$$

The formula for energy balance of the circuit writes:

$$Wcir(i)=Wcir(i-1)+W0+W(+)$$

Remark: this formula is true when, for each period (i), there is a quantity of energy equals to Wmag(i) provided to mass M at the time of its connection to the truck 14 at the upper point A.

The formula for energy balance of the circuit (by period) can also write:

$$Wcir(i)=Wtcir(i-1)+W(+)$$

where Wcir(i) is the total quantity of energy of the circuit at the end of period (i).

In fact, once the circuit 12 reaches, via W0, a velocity V0 exceeding the minimum velocity Vcir(min) required for masses M disconnecting form the circuit at the lower point F to reach the circuit back at the upper point A and for these masses M to start following the mass track 30 (see FIG. 6), work W0 is no longer provided to the circuit, as long as W(+) is positive (larger than zero).

It has to be reminded that W(+)=Wpot−Wres and that Wpot, at the disconnecting of the first mass M, is equal to [M*g*RM], and to [M*g*(RM+P)] at the disconnecting of the second mass M, and to [M*g*(RM+(2*P))] at the disconnecting of the third mas M, up until Wpot reaches its maximum value, being Wpot=M*g*(h+(2*RM)) with [h=Nh*P].

In the functioning principle (subject of the invention) of the machine 10, W(+) must be positive, and it is possible to keep or change the value of W0 for increased gain of energy.

For the following, let's take:

$$Wcir(i)=Wcir(i-1)+W(+)$$

Hence, at each period (i), a quantity of energy equals to W(+) gets added to the circuit 12, but one should not forget that for this condition to apply one had to provide to the mass M, at the time of connection at the upper point A, at the beginning of period (i), a quantity of energy equals to:

$$Wmag(i)=[(½)*M*Vcir(i-1)^2]-WMA(i)$$

Wmag(i) is then equal to the energy lost by circuit 12 with the disconnecting of mass M at the lower point F and which is equal to $[(½)*M*Vcir(i-1)^2]$ less the kinetic energy WMA (i) that is gained back by the system for connecting masses at the upper point A of the circuit 12, from the mass M reaching the magazine 40 after its disconnection from said circuit at period (i−Nh−2).

Hence, in order to allow the circuit 12 to gain for each period (i) due to potential energy from masses M, one must input to the circuit, at each period (i), a quantity of energy equals to Wmag. But, after a certain number of periods, the total amount of provided energy Wmag exceeds the amount of energy stored into the circuit 12. This is explained by the fact that the quantity of energy W(+) added to the circuit 12 for each period (i) (which increases the circuit's velocity Vcir) is a constant, while the quantity of energy Wmag, provided to the circuit 12 for each period (i), increases with its velocity. Furthermore, Wmag reaches the value of Wpot once the velocity of the circuit 12 reaches the minimum value required for the mass M to run all the way along the mass track 30 because of its own kinetic energy, from which it is required to have the existing centrifugal forces, the value of which depends on the velocity of the circuit, intervene in such a way that provide to said circuit an addition of energy, which leads to the following.

B—System for Exploiting Centrifugal Forces

Figure 8B:
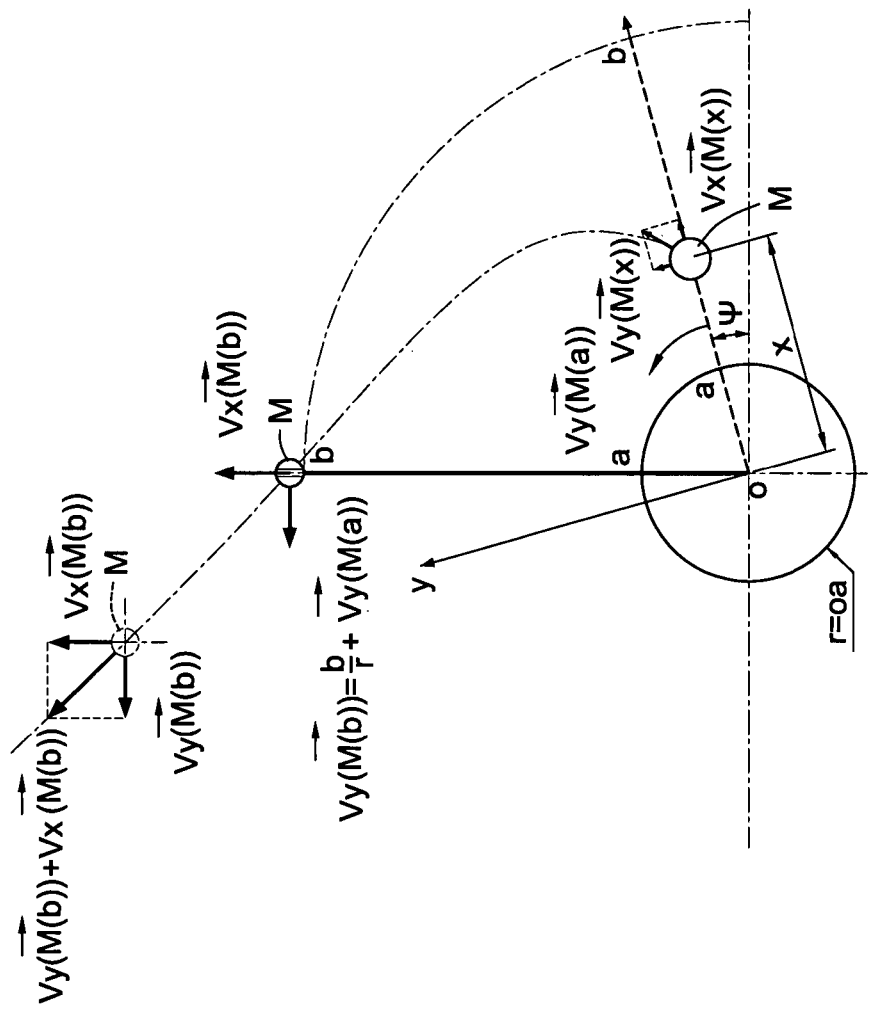
FIGS. 8a and 8b are schematic elevation views for explanation of the way centrifugal forces acting on masses are exploited by a system for exploiting centrifugal forces in accordance with an embodiment of the present invention.
Figure 8A:
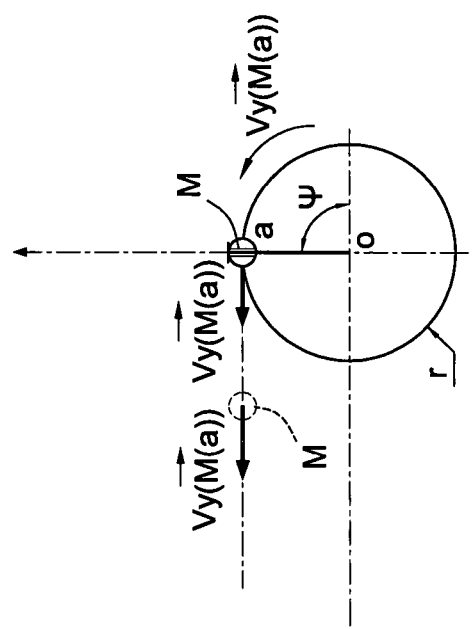

Referring to FIG. 8a, it is well known that a mass M following a circular trajectory has a natural tendency to follow a rectilinear trajectory that is tangential to the circle it draws, the mass M is then forced to follow the circular trajectory because of a centripetal force due to the physical link between the mass M and the center of rotation (o).

When this link is broken, the centripetal force is absent and the mass M is not forced to follow the circular trajectory anymore, which is explained by the fact that the mass, once freed, follows a rectilinear trajectory tangent to the circle, because of its own stored energy.

Now referring to FIG. 8b in which frame o-x-y is linked to rod (a-b), there is shown the case in which mass M is free to slide along rod (o-b) (shown in a first position in dotted line and in a second position in solid line) that is in rotation, illustrated by angle ψ, with a constant angular velocity [Vy(M(a))/r]. Hence, there is, between points (a) and (b), a mass M without any physical link to the center of rotation (o) for it to be retained radially relative to the center of rotation in such a way to eliminate the centripetal force. In the opposite, mass M, because of its sliding connection to rod (o-b), will have to follow the rotation thereof, which will make this mass M to undergo a centrifugal force pulling it along the rod (o-b), from point (a) towards point (b). This centrifugal force is variable since it depends on the position of the mass M therealong, where axis (o-x) (x=o-M is the distance separating mass M from the center (o)), and on its linear (tangential) velocity Vy(M(x)), two parameters varying between points (a) and (b).

For a better explanation, in a more specific case, the following calculation is obtained from schematic of FIG. 8b.

For ψ=0, the linear linéaire (tangential) velocity of mass M is equal to Vy(M(a)). Therefore, mass M has a tangential kinetic energy of $[Ecy(M(a))=(M*Vy(M(a))^2)/2]$. Because of its only one degree of freedom, being a translation along rod (o-b), mass M also undergoes, at point (a), a centrifugal force equals to $[Fcx(M(a))=(M*Vy(M(a))^2)/r]$, where (r) is the distance (o-a) along axis (o-x).

For an incremental rotation of delta(ψ), mass M, under the effect of centrifugal force Fcx(M(a)), will move towards point (b) of (delta(x)), and its radius of rotation will then be:

$$x=r+delta(x)$$

and its linear velocity will be:

$$Vy(M(x))=(r+delta(x))*Vy(M(a))/r$$

because the angular velocity Vy(M(a))/r remains constant. During this incremental displacement, kinetic energy is added to mass M. Then at this point, the kinetic energy of the mass M must be of $$Ecy(M(x))=(M*Vy(M(x))^2)/2=[((r+delta(x))/r)^2]*Ecy(M(a))$$

Which implies that mass M undergoes then a centrifugal force at point x=(r+delta(x)) of $$Fcx(M(x))=(M*Vy(M(x))^2)/(r+delta(x))=[(r+delta(x))/r]*Fcx(M(a))$$

It is then possible to write down $$Fcx(M(x))=M*G(x)$$

where G(x) is the acceleration of mass M due to the centrifugal force along rod (o-b), or the axis (o-x) within frame (o-x-y) (see FIG. 8b). Hence:

$$G(x)=(Vy(M(x))^2)/(r+delta(x))=(r+delta(x))*(Vy(M(a))/r)^2$$

Since the tangential velocity Vy(M(a)) is constant, it is possible to get the time duration needed to induce a rotational increment of delta(ψ).

In general [V=L/t], hence [t=L/V], which gives $$delta(t)=(r*delta(ψ))/Vy(M(a))$$

And the position of mass M, x(M(x)) and its velocity Vx(M(x)) along axis (o-x) are obtained as a function of delta(ψ):

$$x(M(x))=[(G(x)*delta(t)^2)/2]+Vx(M(a))*delta(t)+r$$

$$Vx(M(x))=G(x)*delta(t)+Vx(M(a))$$

As the radial velocity of mass M at point (a) (at angle ψ=0) Vx(M(a)) is null [Vx(M(a))=0], for the first angular increment of delta(ψ):

$$x(M(x(1)))=[(G(x)*delta(t)^2)/2]+r$$

$$Vx(M(x(1)))=G(x)*delta(t)$$

And for subsequent ones, $$x(M(x(j)))=[(G(x(j-1))*delta(t)^2)/2]+Vx(M(x(j-1)))*delta(t)+x(M(x(j-1)))$$

$$Vx(M(x(j)))=G(x(j-1))*delta(t)+Vx(M(x(j-1)))$$

Using these above two equations, it is possible to calculate, point by point, the trajectory of mass M for a determined rotational angle, as well as its velocity at the longitudinal extremity of rod (o-b), and the direction that will follow the mass M once detached from said rod. The velocity of the mass will therefore be the vector sum of its tangential velocity Vy(M(b)) and its normal, or radial velocity Vx(M(b)):

$$\overrightarrow{V(M(b))} = \overrightarrow{Vy(M(b))} + \overrightarrow{VxM(b)}$$

And the mass kinetic energy will be:

$$Ec(M(b))=(M*V(M(b))^2)/2$$

In order to maintain the angular velocity constant, a quantity of tangential energy had to be provided to the mass M as an amount of kinetic energy of:

$$M*[Vy(M(b))^2-Vy(M(a))^2]/2$$

This amount of energy will be part of the mass' energy at point (b), and will be the kinetic energy of mass M along axis (y) Ecy(M) [Energy conservation law] and, in addition, there is some kinetic energy Ecx(M) due to the centrifugal forces.

This surplus of kinetic energy Ecx(M) due to the centrifugal forces will be exploited within circuit 12 of the present invention in two different ways described hereinbelow, and, accordingly, trucks 14 as schematically illustrated in FIGS. 9a and 9b will be considered.

FIGS. 9a and 9b are an embodiment (amongst many others possible) of a truck 14 made of two main parts, a fixed part 14f and a mobile part 14m, in closed and deployed configurations, respectively. The fixed part 14f is typically provided with bearings 16 allowing it to follow the trajectory of the internal rails Ri, and the mobile part 14m is typically telescopically, or the like, linked to the respective fixed part 14f with a translation generally perpendicular the axis 16a extending through the center of rotation of the bearings 16f of the fixed part 14f of the truck and generally perpendicular to the local trajectory of the internal rails Ri as its only one degree of freedom. The mobile part 14m is the part that selectively receives the mass M that connects thereto via a mechanical system or the like (not shown). A mechanical connecting system or the like, such as the external rails Re (shown as illustrative purposes only in FIGS. 9a and 9b), on which roll the bearings 16m of the mobile part 14m of the truck and/or the bearings 20 of the mass M (depending on the position of the truck or the mobile unit, truck+mass M, along circuit 12), maintain the two parts 14f, 14m of the truck in proximity relative to each other in the closed configuration and further allow the free radial deployment, along a trajectory predetermined by calculation, of the mass M and/or the mobile part 14m relative to the fixed part 14f in predetermined curved section(s) of the circuit 12.

Example of an Embodiment of the System for Exploiting Centrifugal Forces

In the following paragraphs, each of the different points A, B, C, D, E, F, G and H of the circuit are denoted with 'i' and 'e' indicia in order to differentiate the corresponding levels of the internal Ri and external Re rails at these respective points (point A including points Ai and Ae, etc.).

Figure 6:
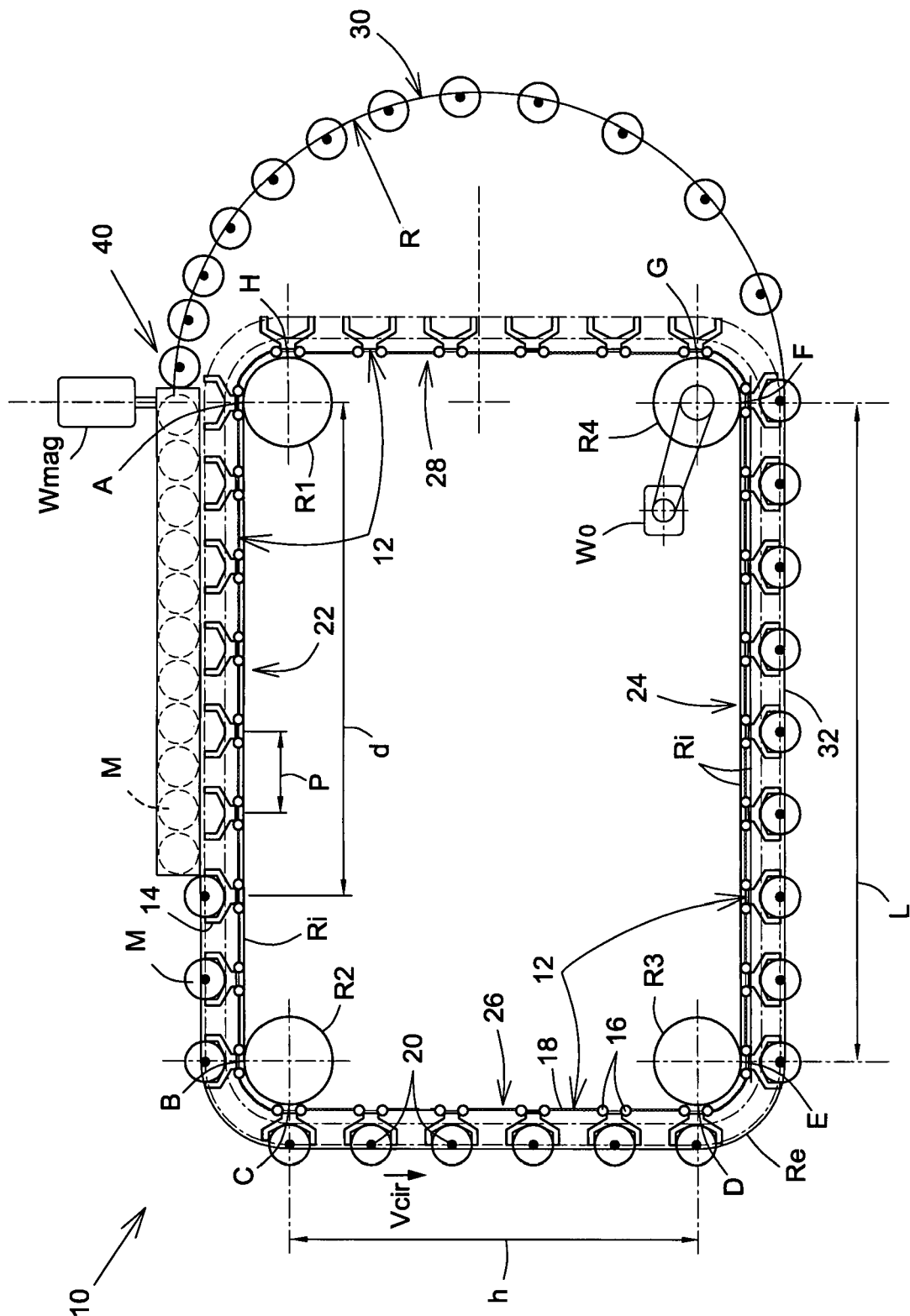
FIG. 6 is a schematic elevation view of FIG. 4 provided with a magazine feed for feeding the upper empty trucks with masses and receiving the masses exiting the mass track, as well as the two systems of external input work W0 (at the circuit level) and, in this version, Wmag (at the level of the system for connecting masses to the circuit at its upper point A)
Figure 10:
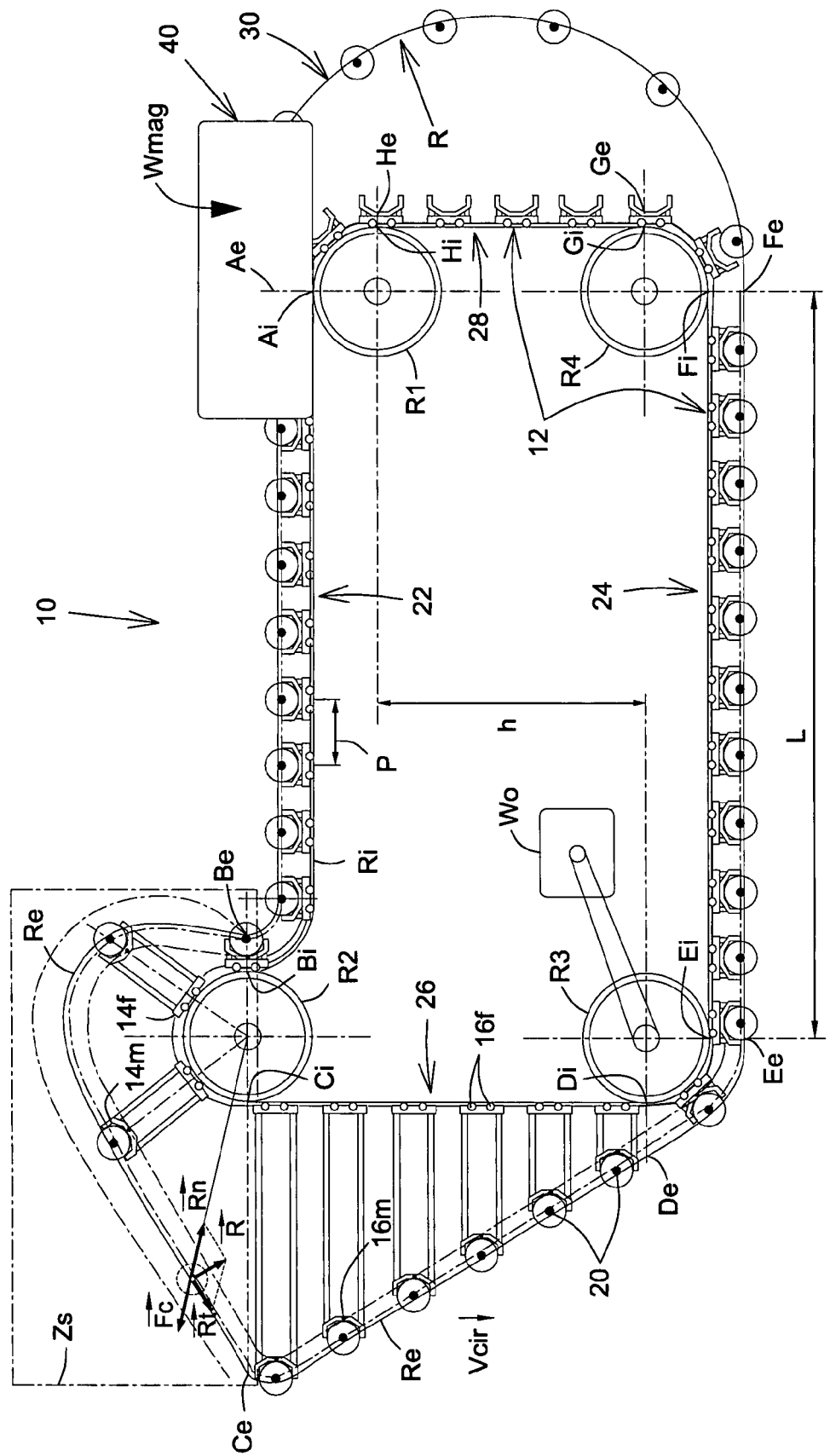
FIG. 10 is a schematic elevation view of FIG. 6 with a system for exploiting centrifugal forces of masses located just after the upper portion endpoint of the circuit.

FIG. 10 shows an example of an embodiment of a system for exploiting centrifugal forces in accordance with the present invention mounted on the circuit of FIG. 6. In a superior zone Zs, just after the upper portion 22 of the circuit 12, at the endpoint B, the system for exploiting centrifugal forces is located into a circular portion that exploits centrifugal forces of the masses M over a curved section of the circuit 12 of a typical angle of 180 degrees (π radians) (any other angle could also be possible) that is part of the system. Accordingly, the external rails Re are modified to have a shape Be-Ce (the trajectory of which can be calculated point by point) such that the component Rt of the reaction R on the masses M due to the centrifugal force Fc that is tangential to the trajectory is the largest possible. The centrifugal force Fc is due to the radially mobile mass unit (Mcm+M) (the mass of the mobile part 14m of the truck 14 plus mass M), to the distance separating that mass from the center of rotation, and to the velocity of the circuit Vcir. It is only required that this trajectory be within the trajectory that could be followed by the mass unit (mobile part 14m plus mass M) while remaining free of any radial (normal) obstruction. This condition ensures the permanent contact with the external rails Re, which generates a reaction R therefrom acting on the mass unit. This reaction R can be broken down into a normal (radial) force Rn opposing to the deployment of the mobile part 14m of the truck relative to the corresponding fixed part 14f, and another tangential force Rt in a same direction than that of the movement of circuit 12 that will generate work in addition to the work from the weight forces of the masses M along the lowering portion 26 of the circuit 12.

Remarks:
The centrifugal force is always perpendicular to the trajectory of the internal rail Ri of circuit 12 along portion Bi-Ci (of internal rail Ri) as well as the work it generates, work due to the displacement of the mass unit (mobile part 14m plus mass M) relative to the fixed part 14f of the same truck 14, thus making this work totally independent from the work of the circuit 12.

The moving away of the mass unit from the centre of rotation of wheel R2 increases the mass unit tangential velocity, hence its kinetic energy. This energy is taken from the circuit energy but will be given back to the circuit from the beginning of the lowering section 26 at points Ci to Ce from the energy conservation law.

The weight force of the mass unit has not been taken into account between points B and C since the work generated there between is null.

Along the lowering portion 26, the external rails Re bring the mass unit back into contact with the fixed part 14f of the truck while absorbing a quantity of energy, due to friction, equals to the mass of the mobile part 14m of the truck plus the mass M times the earth gravitational acceleration constant (g) times the coefficient of friction Cf times the horizontal distance between points Ce and De.

Other Example of an Embodiment of the System for Exploiting Centrifugal Forces

Figure 11:
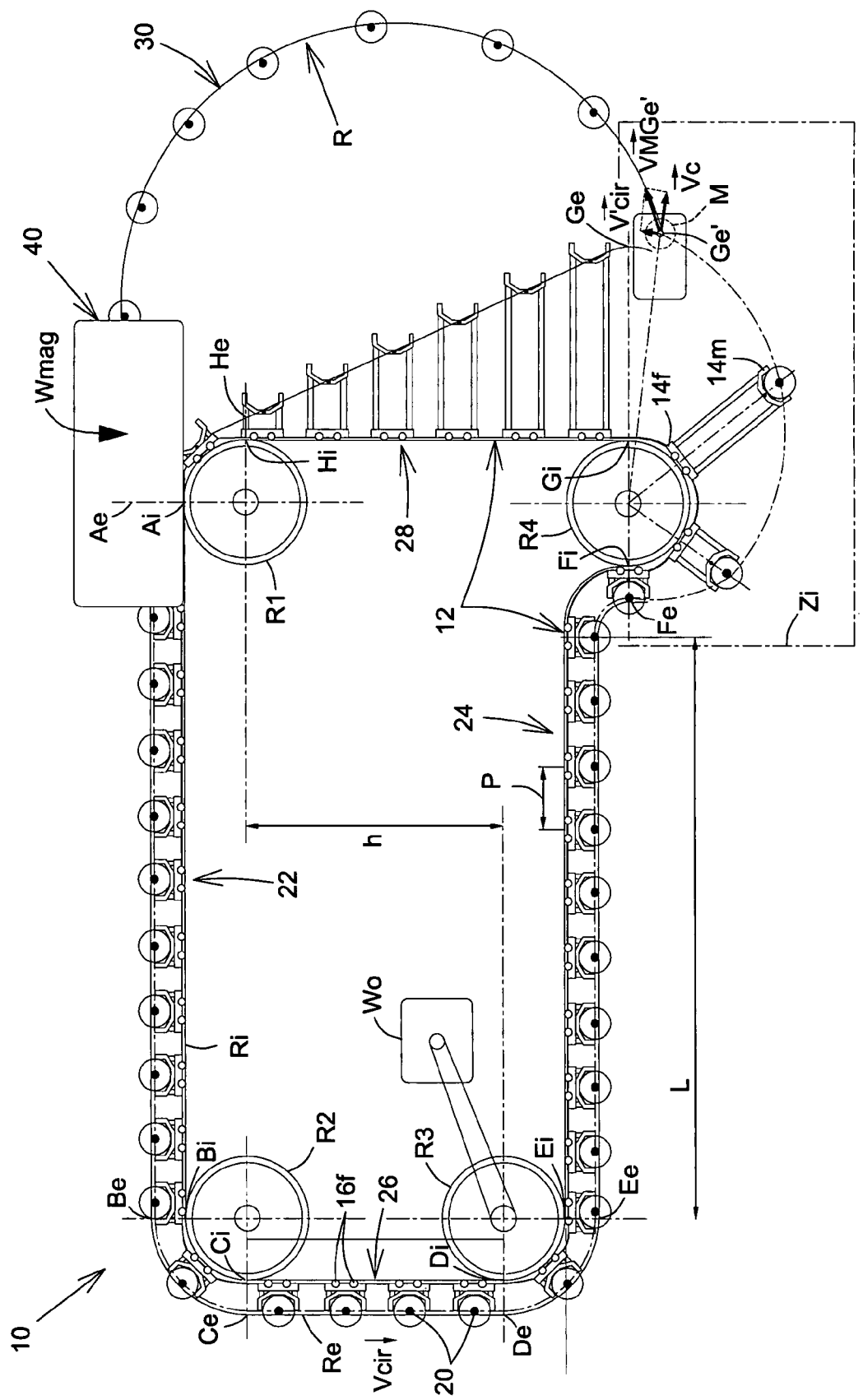
FIG. 11 is a schematic elevation view of FIG. 6 with a system for exploiting centrifugal forces of masses located just before the lower point of the circuit.

FIG. 11 shows another example of an embodiment of a system for exploiting centrifugal forces in accordance with the present invention mounted on the circuit of FIG. 6. In an inferior zone Zi, just after the lower portion 24 of the circuit 12, at the lower point F, the system for exploiting centrifugal forces is located into a circular portion that exploits centrifugal forces of the masses M over a curved section of the circuit 12 of a typical angle of 180 degrees (π radians) (any other angle could also be possible) that is part of the system, in a way of extending the lower point F up to point G. Accordingly, the external rails Re end at point Fe (point F at the level of the external rail Re), in order to release the mass unit that undergoes an acceleration, due to centrifugal forces, moving it away from the center of rotation of wheel R4. This displacement remains generally perpendicular to the trajectory of the inner rail Ri between points Fi and Gi, hence the work generated by this displacement does not depend from the work of the circuit 12, and in these conditions, the mass unit moves along the trajectory between points Fe and Ge under the action of two velocities, a tangential velocity V'cir with

[V'cir=Vcir*r(Mmc+M)/r] and a normal or radial velocity Vc due to centrifugal forces. At point Ge', beginning of the mass track 30 and in proximity of point Ge, the mass unit runs through the mass disconnecting system which disconnects the mass M from the mobile part 14*m* of the truck with no constraint to the displacement of the mass (the mass disconnecting system could be mechanical based or any other).

Once mass M is disconnected, it is at the beginning of the mass track 30 that has its entrance portion always maintained tangential to the direction of motion of mass M, typically automatically. The direction of motion of mass M, once disconnected from the mobile part 14*m*, is function to the direction of its velocity VMGe' at point Ge', that is the vector sum of the two velocities V'cir and Vc which are always perpendicular to each other.

$$\overrightarrow{VMGe'} = \overrightarrow{V'cir} + \overrightarrow{Vc}$$

Mass M then enters the mass track 30 with a kinetic energy equals to:

$$Ec(MGe')=M*(VMGe'^2)/2$$

Once mass M is disconnected from the mobile part 14*m* of the truck, the mobile part 14*m* is in contact with the external rails Re at point Ge via its bearing 16*m* (this contact must occur after the disconnection mass M therefrom). In moving up along the raising portion 28 of the circuit 12, between points Ge and He, the external rails Re bring the mobile part 14*m* back into contact with the corresponding fixed part 14*f*, and this absorbs, per period (i), an energy due to the friction equals to the mass of the mobile part 14*m* times the earth gravitational acceleration constant (g) times the coefficient of friction Cf times the horizontal distance between points Ge and He.

Figure 12:
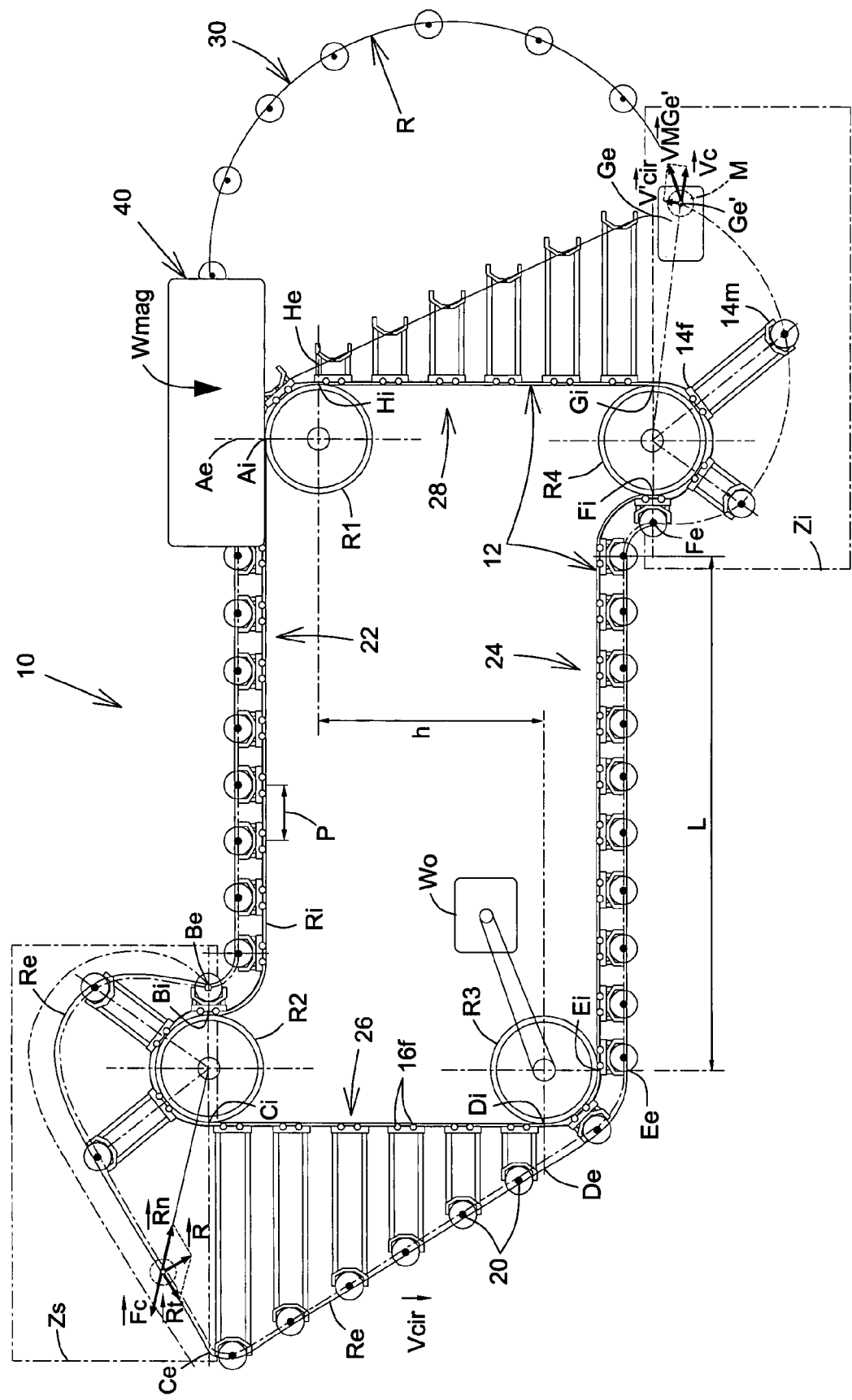
FIG. 12 is a schematic elevation view of FIG. 6 with a combination the systems for exploiting centrifugal forces of masses of FIGS. 10 and 11.

Both embodiments of the system for exploiting centrifugal forces described hereinabove could also be used on a same circuit as schematically shown in FIG. 12, and then the balance of work of the machine 10 would be:

$$Wcir(i)=Wcir(i-1)+W0+W(+)+WMA(i)$$

with $$W(+)=Wpot+W[Fc(Be-Ce)]-Wres$$

where Wres is the energy dissipated by the friction forces along circuit 12; W[Fc(Be-Ce)] is the energy generated by the centrifugal forces between points Be and Ce; and $$WMA(i)=[(\tfrac{1}{2})*M*(V'cir(i-Nh-2)^2+Vc(i-Nh-2)^2)]-[M*g*2*R]-WfM$$

where WfM is the energy dissipated by the friction forces along the mass track 30.

In all cases presented in FIGS. 10, 11 and 12, it is possible to temporarily stop the input of external energy W0 as soon as [Wcir(i)−Wcir(i−1)] becomes and remains positive.

Operation of the Machine of the Present Invention

Step a: Using an input of external energy W0, the velocity of circuit 12 is brought up to a predetermined velocity Vpre (in function of the different physical parameters of the machine 10 and of the closed circuit 12) larger than the required minimum velocity Vcir(min) allowing for the value [Wcir(i)−Wcir(i−1)] to become positive.

Step b:

For the embodiment shown in FIG. 10, once the circuit 12 has reached the predetermined velocity Vpre, the mass disconnecting system is activated, typically automatically, and disconnects mass M from its truck 14 at lower point F of said circuit 12, and the disconnecting of the mobile part 14*m* of the truck from its fixed part 14*f* occurs only between points Be and Ce.

For the embodiment shown in FIG. 11, and partially FIG. 12, once the circuit 12 has reached the predetermined velocity Vpre, the mass disconnecting system is activated, typically automatically, and disconnects mass M from the mobile part 14*m* of the truck 14 each time a mass unit gets to point Ge' at the beginning of the mass track 30. Typically, there is no need in these cases of a specific system for connecting to and disconnecting from each other of the fixed 14*f* and mobile 14*m* parts of the truck, and which is typically provided by the external rails Re.

Step c: As soon as the first empty truck 14 gets to the upper point A of the circuit 12, the mass connecting system is activated ans connects, typically automatically, a mass M to each empty truck arriving at upper point A of circuit 12. Also, said mass connecting system recuperates the kinetic energy WMA of each mass M reaching its magazine 40 from the lower point F or Ge' (according to the system for exploiting centrifugal forces being present (FIG. 10 or FIG. 11 or other)), after running along the mass track 30. In the case shown in FIG. 10, the mass connecting system provides to the mass M the same velocity reached by the circuit Vcir using an input of external energy Wmag, as long as required.

Step d: As soon as it is possible, it is preferred to stop or modify the input of all external energy.

Step e: There is a selective coupling of the machine 10 to a load machine once the value of work aimed for is reached.

Remarks:

A plurality of machines 10 can be coupled to a same load machine.

Referring to FIGS. 5*a* to 5*d*, depending on the values of h and L, namely whether they are zero or not, the circuit 12 may have different configurations as shown. Furthermore, when h=0, the mass track 30 is 20 preferably slightly placed laterally horizontally away from the upper and lower portions 22, 24 of circuit 12 by a distance I to allow masses M to fully disconnect from their respective truck 14 before raising toward the upper point A, as shown in FIGS. 5*c* and 5*d*.

Alternatives

Although the closed circuit 12 disclosed hereinabove and shown throughout the figures lies in a generally vertical plane, one skilled in the art would easily understand that any other closed-circuit having only a portion thereof located in a non-horizontal plane could be considered without deviating from the scope of the present invention.

Also, it is obvious that many technical solutions can reduce considerably the coefficient of friction, which will in turn reduce the resistant work (Wres). For example, instead of using roller bearings 16, the trucks 14 could be displaced on oil or pressurized air, or be levitating spaced away from the inner rail(s) using permanent magnets or the like.

In a different way, as in the case of FIG. 10, the masses M could partially disconnect form their respective truck 14 when reaching the start point E of the circuit lower portion 24 and start rolling on a lower portion 32 (see FIGS. 4, 6 and 7) of the mass track 30. The masses M would remain partially connected to their truck 14 with roller bearings (not shown) mounted on the trucks to rollably push the masses M along the track lower portion 32 such that they could completely disconnect from the trucks at the lower point F.

The mass connecting system for the connection of masses M to the respective trucks 14 adjacent upper point A could be effected in different ways, as described in the following examples, with no intention of any limitation.

a—By using a magazine 40 of masses M which is driven by, typically horizontally, or operatively connected to the circuit 12 itself to operate at a velocity substantially equal to the circuit velocity Vcir, as schematically shown in, FIG. 6. This permits simple connection (insertion) of a mass M to each empty truck 14 which arrives at upper point A, by providing the mass M (as in the case of FIG. 10) with an input external work the quantity of energy that will allow it to reach the velocity of the circuit 12 with the mass M being disconnected from lower point F being placed into the magazine 40, where its kinetic energy will be recuperated. The only condition for such a configuration would be that the number of masses M in the magazine 40 (in addition to the masses M connected to the circuit 12 all along its length), shown in dotted lines in FIG. 6, must be at least equal to the distance d which separates the location of empty truck 14, from which a respective mass M is disconnected at lower point F, from the respective mass M when the respective mass M reaches the upper point A divided by the periodic distance P of a period (i). In other words:

Number of masses $M$ in the magazine $\geqq (d/P)$

Figure 7:
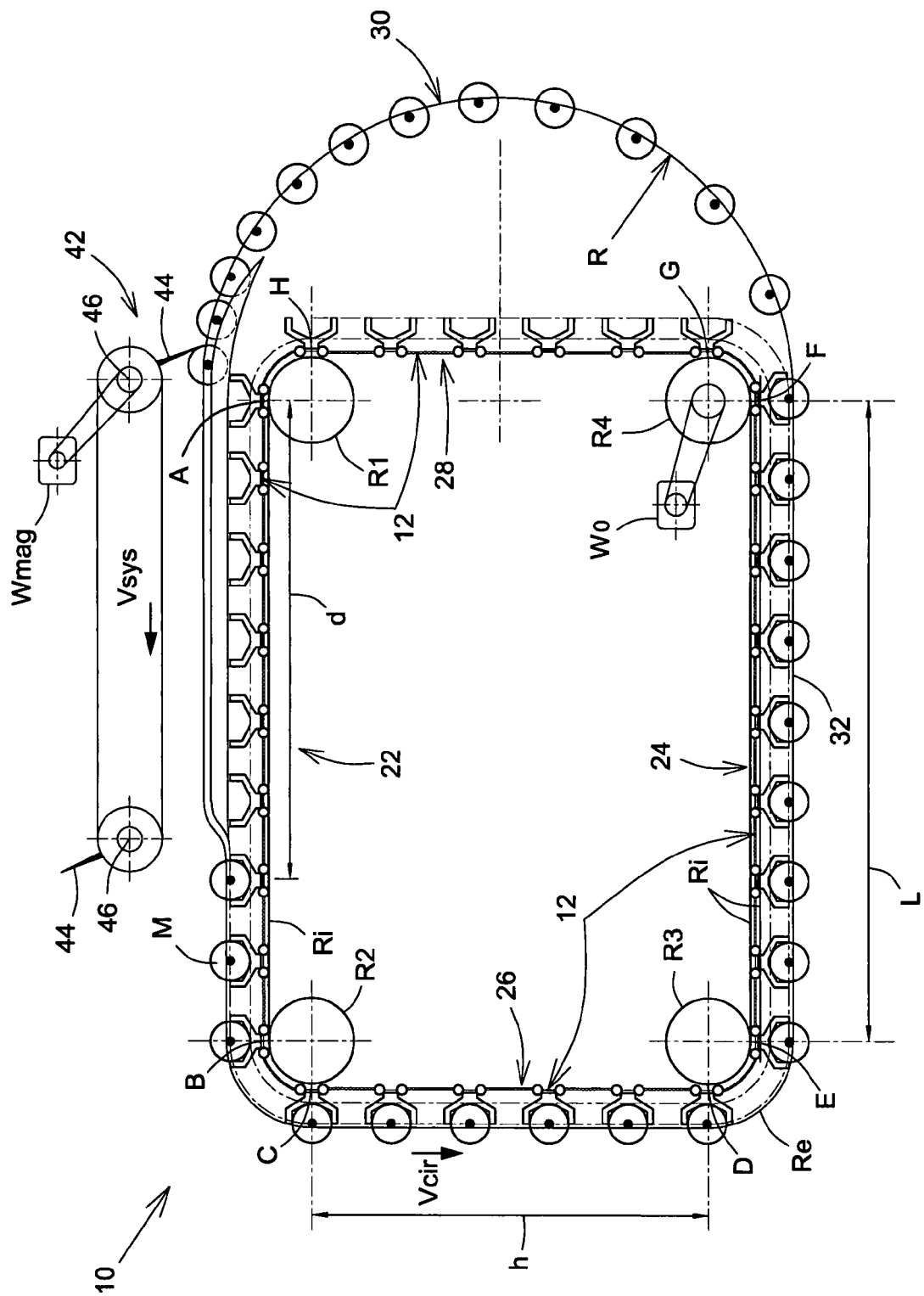
FIG. 7 is a schematic elevation view of FIG. 4 provided with an alternate embodiment of mass delivery mechanism.

This solution could prove particularly adequate if h=L=0 or if L=0 (see FIGS. 5b and 5d).

b—The connecting system includes a mass delivery mechanism 42 equipped with two equidistant arms 44, separated by the distance d+P, typically driven in rotation by an external work Wmag (as in the case of FIG. 10) with a velocity ratio Rv=(d+P)/P relative to the circuit velocity Vcir to displace the mass M from the upper point A to the empty truck 14 with a system velocity Vsys=Rv*Vcir. In this case, as schematically shown in FIG. 7, the friction force due to the weight of the mechanism on its own rotation axes 46 adds up to the friction of the resistant work (Wres). The condition required for this mechanism to be implemented is:

$L \geqq (d+P)$

In a different embodiment, as in the case of FIG. 11, where applicable, the trucks 14, with their mass M attached thereto via a mechanical system (not shown), could turn around the 4 wheels R1, R2, R3, R4 by being releasably attached thereto without rolling on the inner rails Ri, which generates considerable friction and centrifugal forces on the wheels and directed towards their axes. In this fashion, the effect of friction caused by the centrifugal forces on any outer rail Re gets eliminated and thus reducing everything down to a question of managing a problem of friction forces acting on the axes on which the wheels turn. This reduced problem can easily be solved by a film of pressurized oil. Such a solution allows the closed circuit to reach high velocities, and therefor high levels of generated power.

Although not illustrated herein, a plurality of similar closed circuits 12 can drive a common output shaft, preferably connected to one or a plurality of load machines, by being positioned in parallel relative to one another, which multiplies the power available at the output shaft by the number of circuits.

As mentioned at the beginning of the description, it would be obvious to one skilled on the art that the closed circuit 12 could be located in a generally horizontal plane, while having a system for exploiting centrifugal forces over at least one curved section of the circuit (without any consideration of transformation of potential energy of masses into kinetic energy), without departing from the scope of the present invention.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the machine functioning principle based on the principle of exploitation of centrifugal forces, and optionally on the principle of gain of potential energy, subject of the present invention as hereinafter claimed.

The invention claimed is:

1. A machine for generating mechanical energy, said machine comprising:
   a closed circuit rotationally driven around at least one rotationally free wheel at least temporarily by an input of external energy, a plurality of masses selectively connecting to the closed circuit to move therealong;
   a system for guiding the masses along the circuit to allow the masses to travel therealong; and
   a system for exploiting centrifugal forces of the masses located on at least one curved section of the closed circuit to add to the circuit an energy from the centrifugal forces of the masses and different than said input of external energy.

2. The machine of claim 1, wherein the system for exploiting centrifugal forces of the masses allows the masses to move in a substantially radial direction when on said at least one curved section.

3. The machine of claim 1, wherein the masses selectively connect to the closed circuit between a relatively upper point thereof and a relatively lower point thereof, and provide kinetic energy to the closed circuit due to transformation of potential energy of the masses while falling within the earth's gravitational field from the upper point to the lower point, and wherein the guiding system includes a mass track adapted to allow the masses to travel from the lower point to the upper point while being disconnected from the closed circuit and using at least their own kinetic energy at the lower point, said machine comprising:
   a system for disconnecting the masses from the closed circuit at a location adjacent the lower point so as to selectively maintain the closed circuit into a state of permanent dynamic unbalance;
   a system for connecting the masses to the closed circuit at a location adjacent the upper point so as to selectively maintain the closed circuit into the state of permanent dynamic unbalance; and
   said at least one curved section of the closed circuit being at least partly located between the upper point and the lower point.

4. The machine of claim 3, wherein the mass track includes a substantially circular arc portion thereof extending between the lower point and the upper point.

5. The machine of claim 4, wherein the mass track includes a generally semi-circular portion thereof extending between the lower point and the upper point.

6. The machine of claim 4, wherein the closed circuit includes a lower portion ending at the lower point, the mass track includes a lower track portion selectively and movably supporting the masses therealong before reaching the lower point.

7. The machine of claim 4, wherein the mass track immediately follows the system for exploiting centrifugal forces of the masses and is substantially tangentially oriented relative to a trajectory of the masses exiting the system for exploiting centrifugal forces.

8. The machine of claim 4, wherein the guiding system includes a subsystem for selectively retaining the masses along the closed circuit at least between the upper point and the lower point.

9. The machine of claim 8, wherein the guiding system includes a plurality of mass trucks displaceable around the at least one wheel for selectively receiving the masses therein along the closed circuit between the upper point and the lower point, the retaining subsystem maintaining the masses into respective said trucks between the upper point and the lower point.

10. The machine of claim 9, wherein each of said trucks includes a fixed part movable along said at least one wheel along the circuit between the upper point and the lower point, and a mobile part radially movable relative to the fixed part between a closed configuration in which the fixed and mobile parts are in proximity to one another and a deployed configuration in which the mobile part is spaced away from the fixed part.

11. The machine of claim 10, wherein mobile part of the truck is selectively and freely radially movable from the closed configuration into the deployed configuration when the truck is on said at least one curved section.

12. The machine of claim 11, wherein the disconnecting system includes a release mechanism to selectively disconnect the masses from the respective of said trucks adjacent the lower point.

13. The machine of claim 12, wherein the closed circuit includes an upper portion starting at the upper point and ending at an upper portion endpoint, and the connecting system connects the masses to the closed circuit at a location between the upper point and the upper portion endpoint.

14. The machine of claim 13, wherein the connecting system includes a mass magazine for receiving the disconnected masses from the lower point adjacent the upper point, the mass magazine temporarily containing at least one said disconnected masses therein and connecting one said at least one said disconnected masses to an empty one of said trucks between the upper point and the upper portion endpoint for each one of the disconnected masses reaching the upper point.

15. The machine of claim 14, wherein the system for connecting masses recuperates at least part of the kinetic energy of the masses disconnected from the lower point once arrived into said magazine.

16. The machine of claim 12, wherein the release mechanism selectively operates when velocity of the masses at the lower point is equal to or larger than a predetermined value, thereby ensuring the masses have sufficient kinetic energy to reach the upper point.

17. The machine of claim 13, wherein the connecting system includes a mass delivery mechanism receiving the disconnected masses from the lower point adjacent the upper point and connecting a received one of said disconnected masses to an empty one of said trucks between the upper point and the upper portion endpoint for each one of the disconnected masses reaching the upper point.

18. The machine of claim 14, wherein the system for connecting masses allows each said mass to have at least the velocity of said circuit at the time of connection therewith using an input of work external to the circuit.

19. The machine of claim 3, wherein the kinetic energy provided to the closed circuit is greater that a resistant work including work consumed by friction forces of the plurality of masses in the relative respective displacement therealong and by the mass connecting system for connection of the respective said masses adjacent the upper point.

20. The machine of claim 3, wherein the system for connecting masses accelerates the masses when arrived at the upper point up to a velocity generally equal to the velocity of said circuit using an input of external energy.

21. The machine of claim 3, wherein the systems for disconnecting masses, for connecting masses and for exploiting centrifugal forces of masses are only activated once the circuit has reached a predetermined velocity.

22. The machine of claim 1, wherein the masses are equally spaced apart from one another along the closed circuit between the upper point and the lower point.

23. A machine for generating mechanical energy, the machine comprising:
    a closed circuit located around one or a plurality of rotationally free wheels with a plurality of masses being displaced therealong, said closed circuit being movably driven to reached a predetermined velocity equal to or larger than a minimum velocity using an at least temporarily maintained input of external initial energy;
    a system allowing the masses to be guided along their displacement along the closed circuit; and
    a system allowing exploitation of centrifugal forces of the masses located on at least one curved section of the closed circuit to add to the circuit an energy from the centrifugal forces of the masses and different than said input of external initial energy.

24. The machine of claim 23, wherein the masses provide the closed circuit with kinetic energy due to the transformation of potential energy of the masses while falling within the earth's gravitational field, said machine including:
    a system allowing the masses to disconnect from the closed circuit at a lower point thereof in order to maintain the closed circuit into a state of permanent dynamic unbalance;
    a system allowing the masses to connect to the closed circuit at an upper point thereof; and
    a system allowing the masses, once disconnected from the closed circuit at the lower point, to join the closed circuit at the upper point using kinetic energy from the mass' own velocity at a time of disconnect from said closed circuit.

25. The machine of claim 24, wherein the system allowing the masses to connect to the closed circuit allows the masses to reach the velocity of the circuit at the time of connection thereto with an input of external energy.

26. The machine of claim 25, wherein the system allowing the masses to connect to the closed circuit includes a system allowing recuperation by the circuit of kinetic energy of the masses once arrived at the upper point.

27. The machine of claim 24, wherein the shape of the circuit allows the masses to have a quantity of energy due to centrifugal forces when disconnecting form said circuit at the lower point, in addition to the kinetic energy generated by the velocity of said circuit.

28. The machine of claim 23, wherein the shape of the circuit generates tangential reactions due to centrifugal forces so as to add positive work to its components in motion.

* * * * *